United States Patent Office 2,971,005
Patented Feb. 7, 1961

2,971,005

N-SUBSTITUTED DERIVATIVES OF 2-BENZYL-AMINOBENZIMIDAZOLES

Edward L. Engelhardt, Gwynedd Valley, Pa., assignor to Merck & Co., Inc., Rahway, N.J., a corporation of New Jersey No Drawing. Filed Oct. 17, 1958, Ser. No. 767,773

11 Claims. (Cl. 260—309.2)

This invention is concerned with benzimidazoles and in particular with 2-aminobenzimidazoles, and especially those compounds wherein the amino group attached to the benzimidazole radical is a tertiary amino group.

The 2-aminobenzimidazoles of this invention can be represented by the following structural formula:

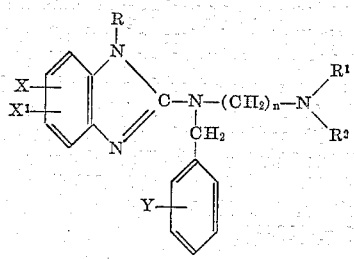

wherein X and $X^1$ each represents hydrogen, halogen or halogen-like radicals, for example, chlorine, bromine, iodine, fluorine, trihalomethyl especially trifluoromethyl, an alkyl radical, advantageously a lower-alkyl radical preferably having from 1 to 4 carbon atoms; or an alkoxy radical, advantageously a lower-alkoxy and preferably one having from 1 to 4 carbon atoms; R is hydrogen or a lower-alkyl radical preferably one having from 1 to 4 carbon atoms; n is 2, 3, or 4;

is a tertiary amino radical such as a di-lower alkylamino radical wherein each of the alkyl radicals has from 1 to 4 carbon atoms or it is a nitrogen-containing heterocyclic radical containing 5 or 6 atoms in the heterocyclic ring such as a pyrrolidyl, piperidyl, morpholinyl, or a 1-alkyl-4-piperazinyl radical; and Y represents hydrogen, halogen or a halogen-like radical, for example chlorine, bromine, iodine, fluorine, or a trihalomethyl radical particularly the trifluoromethyl radical, an alkyl radical, advantageously having from 1 to 4 carbon atoms, or a lower-alkoxy radical, preferably having from 1 to 4 carbon atoms. Any one or more of the alkyl and alkoxy radicals represented by the variable radicals X, $X^1$, R, $R^1$, $R^2$, and Y can be either a straight chain or a branched chain radical. One or more of the hydrogens of the alkylene chain $—(CH_2)_n$ can be substituted by an alkyl group so long as the total number of carbons in all such substituent alkyl groups does not exceed four.

The acid addition salts and the quaternary ammonium derivatives of the above described compounds are included within the scope of this invention, and are considered to be the equivalent of the bases.

The compounds of this invention are useful therapeutic agents for human or, especially, for veterinary use, particularly because of their local anesthetic and antifibrillatory properties. These compounds exhibit local anesthetic activity of relatively long duration which makes them especially valuable not only as local anesthetics but also for the treatment of pruritic conditions. Some of the compounds also are useful in the treatment of cardiac arrhythmias by virtue of their antifibrillatory properties.

The compounds can be administered as injectable solutions, as ointments, or as tablets, pills, capsules, or any other dosage form suitable for oral, parenteral, or topical application. The dosage will necessarily vary over a wide range depending upon the route of administration, the symptoms to be treated, and the size of the animal, and for this reason scored tablets or other dosage forms containing from about 50, 100, 150 or more milligrams of active ingredient per unit dosage can be made available to the physician for the symptomatic adjustment of dosage to the individual patient.

Several new methods have been devised for making the novel compounds described herein and these methods constitute another feature of this invention. While all of the compounds falling within the scope of this invention can be made by each of the new methods, some are produced in greater yields by one method than by another of the preferred methods described below.

METHOD A

The compounds of this invention can be prepared readily by a method wherein a benzimidazole having attached to its 2-position a reactive group selected from halogen, an alkylsulfonyl, or a sulfonic acid group, is condensed with an N-benzylalkylenediamine according to the following reaction scheme:

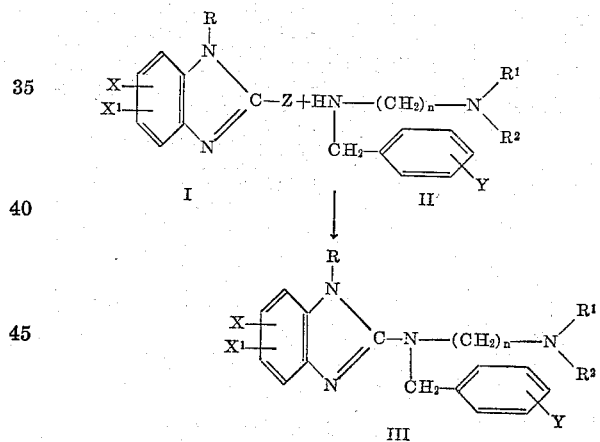

The substituent (Z) in the 2-position of the benzimidazole compound (I) can be halogen, preferably chlorine, an alkylsulfonyl or a sulfonic acid groups. The reaction between the benzimidazoles, I, and the N-benzylalkylenediamine, II, preferably is carried out with heating in the presence of a solvent, such as phenol, m-cresol, or quinoline. In some cases an acid addition salt of the N-benzylalkylenediamine can be used in the reaction, such as a mono- or di-acid addition salt of the diamine, and preferably a mineral acid addition salt. At least equimolecular quantities of the reactants are employed in this process which advantageously is brought about by heating, preferably at between about 100-200° C.

While the above reaction conditions have been found to be suitable in preparing the novel compounds of this invention, it is to be understood that slight modifications can be made in the procedural steps and reaction conditions without departing from the scope or intent of this feature of the invention.

METHOD B

The compounds of this invention also can be prepared by a method which is illustrated by the following reaction scheme:

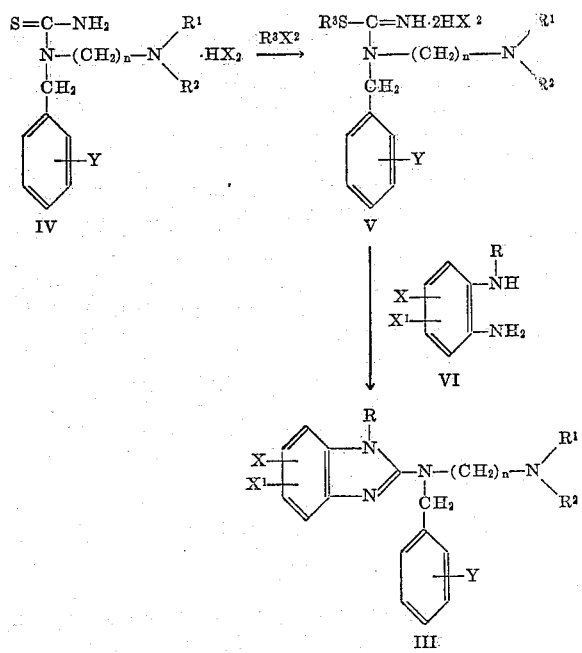

The S-alkylation of the thiourea, IV, can be carried out most advantageously by heating with an alkyl halide, an aralkyl halide, or an ester of a sulfonic acid such as an alkyl p-toluenesulfonate in an acidic medium such as methanol containing an excess of a mineral acid, a sulfonic acid, or the like, employing at least equimolecular quantities of the reactants and by heating, between about 40–100° C. If the alkyl halide used is volatile an autoclave is employed. By employing these conditions excellent yields of compound V are obtained.

The S-alkylisothiourea, V, then is condensed with the appropriate o-phenylenediamine, VI, to form the novel 2-aminobenzimidazoles, III, of this invention. Best results are obtained by pulverizing each of the reactants and employing an excess of the selected o-phenylenediamine. The reactants then are moderately heated to bring about a fusion, which generally occurs at a temperature between about 90–120° C., while passing a slow stream of an inert gas, such as nitrogen or $CO_2$ or the like, through the reaction flask. The reaction generally requires from about 12–72 hours for completion depending upon the nature of the reactants employed.

The acid addition salts and the quaternary ammonium derivatives of the 2-aminobenzimidazoles are prepared by methods well known to chemists. The acid addition salts, for example, are prepared by dissolving the base in alcohol and adding the calculated quantity of the desired acid. The salt is isolated by evaporating the solvent and it can be recrystallized from a suitable solvent such as a mixture of alcohol and ether.

The quaternary ammonium derivatives can be prepared by dissolving the selected base in a suitable solvent, such as an alcohol, and adding the desired quaternizing agent.

Each of the above Methods A and B, as well as the preparation of salts and a suitable dosage form for administering the novel compounds, will be illustrated by the following examples.

While the examples describe the optimal conditions for practicing the invention described herein, modifications can be made without departing from the scope of this invention.

EXAMPLE 1

N-(2-benzimidazolyl)-N-benzyl-N',N'-dimethyl-ethylenediamine 2-chlorobenzimidazole (3.05 g., 0.02 mole) and N-benzyl-N',N'-dimethylethylenediamine (3.57 g., 0.02 mole) are heated to 150° C. in 15 g. of phenol as solvent for 16½ hours. Concentrated hydrochloric acid (2 ml.) then is added and the reaction mixture steam distilled until free of phenol. The residue is concentrated to approximately 50 ml. and a small amount of tarry black precipitate removed. The solution is treated with 2 ml. of hydrochloric acid and extracted with chloroform to remove non-basic material. On making the aqueous layer basic with sodium hydroxide an oily solid separates that is collected, dried, and recrystallized from a mixture of benzene and hexane. Subsequent recrystallization from a mixture of alcohol and water yields 2.35 g. (40%) of N-(2-benzimidazolyl) - N - benzyl-N',N'-dimethylethylenediamine, M.P., 176–177° C.

EXAMPLE 2

N-(2-benzimidazolyl)-N-benzyl-N',N'-dimethyl-ethylenediamine

N-benzyl-N',N'-dimethylethylenediamine (1.78 g., 0.01 mole) and benzimidazole-2-sulfonic acid (1.98 g., 0.01 mole) are mixed with 10 ml. of quinoline and the mixture heated to 135–140° C. for 24 hours. The mixture then is treated with 10 ml. of 20% sodium hydroxide solution and steam distilled until free of quinoline. The dark brown insoluble resin is dissolved in 50 ml. of chloroform and the solution extracted with a solution of 2.5 g. of citric acid in 50 ml. of water. The aqueous extract is made basic with sodium hydroxide and the precipitated product collected and recrystallized from alcohol. The N - (2-benzimidazolyl)-N-benzyl-N',N'-dimethylethylenediamine melts at 170–173° C. (sinters, 170° C.). The yield is 0.83 g. (28%).

EXAMPLE 3

N-(2-benzimidazolyl)-N-benzyl-N',N'-dimethyl-ethylenediamine

N-benzyl-N',N'-dimethylethylenediamine dihydrochloride (2.51 g., 0.01 mole) and 2-methylsulfonylbenzimidazole (1.96 g., 0.01 mole) are dissolved in 20 ml. of m-cresol by warming and the solution then is heated to 190–195° C. in an oil bath for 6½ hours. The clear, light brown solution then is diluted with 25 ml. of water, 2 ml. of acetic acid added, and the mixture extracted with 25 ml. of ether. The ether layer is back-extracted with a solution of 2 ml. of glacial acetic acid and 25 ml. of water and the combined aqueous layers extracted once more with 25 ml. of ether. The aqueous phase then is made alkaline with sodium hydroxide and extracted with ether. After evaporation of the ether, the semicrystalline residue is crystallized from a mixture of alcohol and water to give 0.175 g. of N-(2-benzimidazolyl)-N-benzyl-N',N'-dimethylethylenediamine, M.P. 173–176° C. (sinters, 171° C.).

EXAMPLE 4

N-(2-benzimidazolyl)-N-(p-methoxybenzyl)-N',N'-dimethyl-ethylenediamine 2-chlorobenzimidazole (15.26 g., 0.1 mole) and N-(p-methoxybenzyl - N',N' - dimethylethylenediamine (20.83 g., 0.1 mole) are dissolved in 75 g. of phenol. The solution is heated to 150° C. for 15 hours. The reaction mixture then is treated with 10 ml. of concentrated hydrochloric acid and steam distilled until free of phenol. A gray solid and an insoluble oil are removed from the solution by filtration followed by extraction with benzene. The aqueous layer is made basic with sodium hydroxide and the base extracted into benzene. The benzene solution is concentrated to approximately 100 ml. and diluted with hexane. The crude product (16.9 g.) is crystallized from a mixture of alcohol and water to give 12.86 g. of product, M.P. 132–134° C. A second crop of 4.05 g. of product, M.P. 127.5–131° C. is obtained from the mother liquors. Further recrystallizations from alcohol-water and benzene-hexane mixtures give N-(2-benzimidazolyl)-N-(p-methoxybenzyl)-N',N'-dimethylethylenediamine, M.P. 135–136° C.

*Analysis.*—Calculated for $C_{19}H_{24}N_4O$: C, 70.34; H, 7.46; N, 17.27. Found: C, 70.59; H, 7.23; N, 17.16.

EXAMPLE 5

*N-(2-benzimidazolyl)-N-(p-chlorobenzyl)-N',N'-diethyl-ethylenediamine*

2-chlorobenzimidazole (15.26 g., 0.1 mole), N-(p-chlorobenzyl)-N',N'-diethylethylenediamine (24.08 g., 0.1 mole) and phenol, 75 g., are mixed and heated to 150° C. for 24 hours. The reaction mixture is treated with 10 ml. of concentrated hydrochloric acid and steam distilled until free of phenol. The solution is extracted with benzene to remove non-basic material, then made basic with sodium hydroxide solution and extracted with benzene. The benzene solution is concentrated and diluted with hexane. The product separates as oily crystals. Recrystallization from cyclohexane gives 7.53 g. of cream-colored oily crystals. The product is dissolved in hexane, 300 ml., and a small amount of insoluble material discarded. The crystals that separate on cooling are oily. The hexane is evaporated leaving 7.42 g. of a pale yellow resinous residue. This material is dissolved in absolute alcohol, a solution of 8.78 g. of 3,5-dinitrobenzoic acid added and the solution diluted with water and concentrated. The 3,5-dinitrobenzoic acid salt of N - (2 - benzimidazolyl) - N - (p - chlorobenzyl)-N',N'-diethylethylenediamine, M.P. 180–181° C. (sinters, 178° C.) weighs 14.98 g. Further recrystallization gives product, M.P., 181–182° C. (sinters, 180° C.).

*Analysis.*—Calculated for $C_{20}H_{25}ClN_4 \cdot 2C_7H_4N_2O_6$: C, 52.28; H, 4.26; N, 14.35. Found: C, 52.48; H, 4.29; N, 14.40.

The salt is warmed in dilute hydrochloric acid and the 3,5-dinitrobenzoic acid that separates is removed by filtration. The solution then is made strongly basic (pH, 10) with sodium hydroxide and extracted with benzene. Evaporation of the benzene gives N-(2-benzimidazolyl)-N-(p-chlorobenzyl)-N',N'-diethylethylenediamine in the form of a colorless resin.

EXAMPLE 6

*N-(2-benzimidazolyl)-N-(p-methoxybenzyl)-N',N'-diethyl-ethylenediamine*

2-chlorobenzimidazole (15.26 g., 0.1 mole), N-(p-methoxybenzyl)-N',N'-diethylethylenediamine (23.64 g., 0.1 mole), and phenol, 75 g., are mixed and heated to 150° C. for 15½ hours. The mixture is treated with 10 ml. of concentrated hydrochloric acid and steam distilled until free of phenol. The solution then is filtered to remove an oily gray solid, concentrated to approximately 100 ml. and extracted with three 100 ml. portions of benzene. The combined benzene extracts are washed with water, concentrated and diluted with hexane. Crystallization could not be induced. Evaporation of the solvent on the steam-bath under reduced pressure gives 21.05 g. of a clear light brown resin. This material is dissolved in absolute alcohol and treated with 16.5 g. of salicylic acid. On diluting the solution with ether and allowing the product to crystallize, the disalicylate of N-(2 - benzimidazolyl) - N - (p - methoxybenzyl) - N',N'-diethylethylenediamine is obtained. Recrystallization from a mixture of absolute alcohol and ether gives N-(2 - benzimidazolyl) - N - (p - methoxybenzyl) - N',N'-diethylethylenediamine, disalicylate, M.P. 166–168° C.

*Analysis.*—Calculated for $C_{21}H_{28}N_4O \cdot 2C_7H_6O_3$: C, 66.86; H, 6.41; N, 8.91. Found: C, 66.82; H, 6.29; N, 8.93.

The salt is warmed with an excess of dilute sodium hydroxide solution and the mixture extracted with benzene. Evaporation of the benzene gives N-(2-benzimidazolyl) - N - (p - methoxybenzyl) - N',N' - diethylethylenediamine in the form of a clear colorless resin.

EXAMPLE 7

*N-[5(6)-methyl-2-benzimidazolyl]-N-(p-chlorobenzyl)-N',N'-dimethylethylenediamine*

2-chloro-5-(6)-methylbenzimidazole (10.0 g., 0.060 mole), N - (p - chlorobenzyl) - N',N'-dimethylethylenediamine (12.76 g., 0.060 mole) and phenol, 50 g., are mixed and heated to 150° C. for 24 hours. The mixture then is treated with 10 ml. of concentrated hydrochloric acid and steam distilled until free of phenol. The solution then is extracted with benzene to remove acid insoluble material, made basic with sodium hydroxide and the product extracted into benzene. After evaporation of the benzene the product is recrystallized from a mixture of alcohol and water. Further recrystallization from a mixture of benzene and hexane gives N-[5(6)-methyl-2 - benzimidazolyl] - N - (p - chlorobenzyl) - N',N'-dimethylethylenediamine, M.P. 167–169° C.

*Analysis.*—Calculated for $C_{19}H_{23}ClN_4$: C, 66.56; H, 6.76; N, 16.34. Found: C, 66.77; H, 6.60; N, 16.44.

EXAMPLE 8

*N - [5(6)-methyl-2-benzimidazolyl]-N-(p-chlorobenzyl)-N',N'-diethylethylenediamine*

2-chloro-5(6)-methylbenzimidazole (5.0 g., 0.03 mole) and N - (p-chlorobenzyl)-N',N' - diethylethylenediamine (7.23 g., 0.03 mole) are heated to 150° C. in 25 g. of phenol as solvent for 24 hours. The reaction mixture then is treated with 5 ml. of concentrated hydrochloric acid and steam distilled until free of phenol. The solution is extracted with benezene to remove non-basic material and made basic with sodium hydroxide. The base that separates is extracted into benzene, the extract washed with water and the benzene evaporated on the steam-bath under reduced pressure. The residue is heated to 200° C. under reduced pressure (0.1 mm.) to remove volatile material. The residue, 6.09 g., is dissolved in alcohol (3A anhydrous) and treated with a solution of (4.54 g., 0.0328 mole) of salicylic acid in 25 ml. of alcohol (3A anhydrous). The solution is concentrated and cooled. The disalicylate of N-[5(6)-methyl-2-benzimidazolyl]-N-(p-chlorobenzyl)-N',N'-diethylethylenediamine, is obtained as a white crystalline product, M.P., 179–181° C. Further recrystallization from absolute alcohol gives product M.P. 181–182° C.

*Analysis.*—Calculated for $C_{21}C_{27}ClN_4 \cdot 2C_7H_6O_3$: C, 64.95; H, 6.07; N, 8.66. Found: C, 64.84; H, 6.09 N, 8.66.

The N - [5(6) - methyl-2-benzimidazolyl]-N-(p-chlorobenzyl)-N',N'-diethylethylenediamine is liberated from the salt as described in Example 6. It is obtained as a white crystalline solid.

EXAMPLE 9

*N-[5-(6)-methyl-2-benzimidazolyl] - N - (p-methoxybenzyl)-N',N'-dimethylethylenediamine*

By substituting 6.25 g. (0.03 mole) of N-(p-methoxybenzyl)-N',N'-dimethylethylenediamine for the N-(p-chlorobenzyl)-N',N'-diethylethylenediamine employed in Example 8, and following substantially the procedure of Example 8, the disalicylate of N-[5(6)-methyl-2-benzimidazolyl] - N - (p - methoxybenzyl) - N',N' - dimethylethylenediamine is obtained. It melts at 174–176° C. after recrystallization from a mixture of absolute alcohol and ether.

*Analysis.*—Calculated for $C_{20}H_{26}N_4O \cdot 2C_7H_6O_3$: N, 9.12. Found: N, 9.31.

The disalicylate salt is suspended in boiling water and the hot solution made alkaline with sodium hydroxide. The base separates as a colorless oil. The mixture is extracted with benzene, the extracts washed with water, concentrated, and diluted with hexane. The white crystalline base melts at 133.5–134.5° C. The M.P. is unchanged after a further recrystallization.

*Analysis.*—Calculated for $C_{20}H_{26}N_4O$: C, 70.97; H, 7.74; N, 16.56. Found: C, 70.69; H, 7.45; N, 16.58.

EXAMPLE 10

N-[5(6) - methyl - 2 - benzimidazolyl]-N-(p-methoxybenzyl)-N',N'-diethylethylenediamine 2-chloro-5(6)-methylbenzimidazole (4.55 g., 0.0273 mole) and N-(p-methoxybenzyl)-N',N'-diethylethylenediamine (6.36 g., 0.0273 mole) are heated to 150° C. in 20 g. of phenol for 15½ hours. The product is isolated substantially as described in Example 8. The disalicylate of N-[5(6)-methyl-2-benzimidazolyl]-N-(p-methoxybenzyl)-N',N'-diethylethylenediamine is obtained as a white crystalline solid, M.P. 168–170° C. after recrystallization from a mixture of absolute alcohol and ether.

*Analysis.*—Calculated for $C_{22}H_{30}N_4O \cdot 2C_7H_6O_3$: C, 67.27; H, 6.59; N, 8.72. Found: C, 67.36; H, 6.52; N, 8.77.

The N-[5(6)-methyl-2-benzimidazolyl]-N-(p-methoxybenzyl)-N',N'-diethylethylenediamine is liberated from the salt as described in Example 6. It is obtained as a crystalline solid.

EXAMPLE 11

N-[5(6)-chloro-2-benzimidazolyl] - N - (p-chlorobenzyl)-N',N'-dimethylethylenediamine 2,5(6)-dichlorobenzimidazole (4.00 g., 0.0214 mole) is heated to 150° C. with N-(p-chlorobenzyl)-N',N'-dimethylethylenediamine (4.46 g., 0.0214 mole) in 15 g. of phenol for 24 hours. The product is isolated substantially as described in Example 4. The N-[5(6)-chloro-2-benzimidazolyl] - N - (p-chlorobenzyl)-N',N'-dimethylethylenediamine melts at 159.5–161° C. after recrystallization from a mixture of benzene and hexane followed by recrystallization from a mixture of acetonitrile and water.

*Analysis.*—Calculated for $C_{18}H_{20}Cl_2N_4$: C, 59.51; H, 5.55; N, 15.42. Found: C, 59.77; H, 5.34; N, 15.44.

EXAMPLE 12

N-[5(6)-chloro-2-benzimidazolyl] - N-benzyl-N'-methyl-N'-propylethylenediamine By replacing the N-(p-chlorobenzyl)-N',N'-dimethylethylenediamine employed in Example 11 by an equimolecular quantity of N-benzyl-N'-methyl-N'-propylethylenediamine, and following substantially the same procedure described in Example 11, N-[5(6)-chloro-2-benzimidazolyl] - N-benzyl-N'-methyl-N'-propylethylenediamine is obtained.

EXAMPLE 13

N-[5(6)-chloro-2-benzimidazolyl] - N - benzyl-2-(1-pyrrolidyl)-ethylamine

By replacing the N-(p-chlorobenzyl)-N',N'-dimethylethylenediamine emloyed in Example 11 by an equimolecular quantity of N-benzyl-2-(1-pyrrolidyl)-ethylamine, and following substantial the same procedure described in Example 11, N-[5(6)-chloro-2-benzimidazolyl]-N-benzyl-2-(1-pyrrolidyl)-ethylamine is obtained.

EXAMPLE 14

N-[5(6)-chloro-2-benzimidazolyl] - N - (p-chlorobenzyl)-N',N'-diethylethylenediamine 2,5(6)-dichlorobenzimidazole (4.00 g., 0.0214 mole) is heated with N-(p-chlorobenzyl)-N',N'-diethylethylenediamine (5.15 g., 0.0214 mole) in 15 g. of phenol under the conditions described in Example 8. The product is isolated substantially as described in Example 8. The disalicylate of N - [5(6) - chloro-2-benzimidazolyl] - N-(p-chlorobenzyl) - N',N' - diethylethylenediamine melts at 163–164.5° C. after recrystallization from a mixture of absolute alcohol and ether.

*Analysis.*—Calculated for $C_{20}H_{24}Cl_2N_4 \cdot 2C_7H_6O_3$: C, 61.17; H, 5.44; N, 8.39. Found: C, 61.21; H, 5.47; N, 8.45.

The N-[5(6)-chloro-2-benzimidazolyl] - N - (p-chlorobenzyl)-N',N'-diethylethylenediamine is liberated from the salt as described in Example 6.

EXAMPLE 15

N-[5(6)-chloro-2-benzimidazolyl]-N-(p-methoxybenzyl)-N',N'-dimethylethylenediamine 2,5(6)-dichlorobenzimidazole (4.00 g., 0.0214 mole) is heated with N-(p-methoxybenzyl)-N',N'-dimethylethylenediamine (4.46 g., 0.0214 mole) in 15 g. of phenol under the conditions described in Example 8. The product is isolated substantially as described in Example 8. The disalicylate of N-[5(6)-chloro-2-benzimidazolyl] - N -(p - methoxybenzyl) - N',N' - dimethylethylenediamine melts at 150–152° C. after recrystallization from a mixture of absolute alcohol and ether.

*Analysis.*—Calculated for $C_{19}H_{23}ClN_4O \cdot 2C_7H_6O_3$: C, 62.41; H, 5.56; N, 8.82. Found: C, 62.30; H, 5.34; N, 8.86.

The N - [5(6) - chloro - 2 - benzimidazolyl] - N - (p-methoxybenzyl)-N',N'-dimethylethylenediamine is liberated from the base as described in Example 6.

EXAMPLE 16

N - (2 - benzimidazolyl) - N - benzyl - 2 - (1 - piperidyl)-ethylamine 2-chlorobenzimidazole (7.63 g., 0.05 mole) is heated to 150° C. with N-benzyl-2-(1-piperidyl)-ethylamine (10.92 g., 0.05 mole) in 37.5 g. of phenol for 24 hours. The product is isolated substantially as described in Example 4. The N-(2-benzimidazolyl)-N-benzyl-2-(1-piperidyl)-ethylamine melts at 143–144° C.

*Analysis.*—Calculated for $C_{21}H_{26}N_4$: C, 75.41; H, 7.84; N, 16.75. Found: C, 75.48; H, 7.86; N, 16.54.

EXAMPLE 17

N - (2 - benzimidazolyl) - N - benzyl - 2 - (4 - morpholinyl)-ethylamine 2-chlorobenzimidazole (7.63 g., 0.05 mole) is heated to 150° C. with N-benzyl-2-(4-morpholinyl)-ethylamine (10.92 g., 0.05 mole) in 37.5 g. of phenol for 24 hours. The product is isolated substantially as described in Example 4. The N-(2-benzimidazolyl)-N-benzyl-2-(4-morpholinyl)-ethylamine melts at 167.5–168.5° C.

*Analysis.*—Calculated for $C_{20}H_{24}N_4O$: C, 71.40; H, 7.19; N, 16.65. Found: C, 71.56; H, 7.02; N, 16.54.

EXAMPLE 18

N - (2 - benzimidazolyl) - N - benzyl - N',N' - dimethylethylenediamine

*Step A.*—N-benzyl-N-(2-dimethylaminoethyl)-thiourea (11.87 g, 0.05 mole), 48% hydrobromic acid (25.4 g., 0.15 mole) and methyl bromide (19.0 g., 0.20 mole) are dissolved in 200 ml. of absolute methanol at −5° C. The mixture, contained in a glass liter, is placed in an autoclave and heated to 65–70° C. for 24 hours. The solvent then is evaporated and the residue dried on the steam-bath under reduced pressure. The residue is crystallized from a mixture of absolute methanol and absolute ether to yield 19.8 g. (96%) of white crystalline N - benzyl - N - (2-dimethylaminoethyl) - S - methylisothiourea dihydrobromide, M.P. 183–184° C. An analytical sample from another experiment melted at 184–185° C. (sintered, 183° C.).

*Analysis.*—Calculated for $C_{13}H_{21}N_3S \cdot 2HBr$: C, 37.78; H, 5.61; N, 10.17. Found: C, 37.84; H, 5.50; N, 10.17.

*Step B.*—N - benzyl - N - (2 - dimethylaminoethyl)-S-methylisothiourea dihydrobromide (20.66 g., 0.05 mole) and 1,2-phenylenediamine (27.03 g., 0.25 mole) are pulverized, intimately mixed and heated to 90–95° C. while passing a slow stream of nitrogen through the apparatus to sweep out the gaseous by-products. After heating for 44 hours, some 1,2-phenylenediamine that has collected on the colder parts of the apparatus is removed mechanically and the residue heated on the steam-bath with 150 ml. of water. An oil layer separates on cooling. The mixture is extracted with ether and the aqueous layer separated and steam-distilled until the volume of the distillate is 2 liters. The residue then is concentrated to approximately 100 ml. and made basic with sodium hydroxide. The product is collected, washed with water and dried. The yield of product, M.P. 173–177° C. is 8.57 g. (58%). Recrystallization from benzene gives 7.70 g. (52%) of N-(2-benzimidazolyl)-N-benzyl-N',N'-dimethylethylenediamine, M.P. 178–179° C. A further recrystallization from benzene followed by recrystallization from a mixture of alcohol and water gives analytically pure material, M.P. 178–179° C.

*Analysis.*—Calculated for $C_{18}H_{22}N_4$: C, 73.43; H, 7.53; N, 19.03. Found: C, 73.56; H, 7.71; N, 19.00.

EXAMPLE 19

*N - [5(6) - methyl - 2 - benzimidazolyl] - N - benzyl-N',N',-dimethylethylenediamine*

N - benzyl - N - (2 - dimethylaminoethyl) - S - methylisothiourea dihydrobromide (20.66 g., 0.05 mole) and 4-methyl-1,2-phenylenediamine (30.54 g., 0.25 mole) are pulverized, intimately mixed and heated to 90–95° C. as described in Example 18, step B. Heating is discontinued after 15 hours. The residue is dissolved in 200 ml. of boiling water, the solution cooled and extracted with ether. The aqueous portion, consisting of two layers is concentrated to a volume of approximately 100 ml. and made basic with sodium hydroxide. The mixture of product and 4-methyl-1,2-phenylenediamine that separates is collected, washed with water, and air dried at room temperature. This mixture weighs 16.9 g. It is heated to 135–140° C. under reduced pressure (0.5 mm.) until sublimation of the unreacted 4-methyl-1,2-phenylenediamine is complete. The residue, a friable gray solid, M.P. 156–160° C., weights 9.30 g. This material is crystallized from a mixture of alcohol and water. The yield of crude N-[5(6)-methyl-2-benzimidazoyly]-N - benzyl - N',N' - dimethylethylenediamine M.P. 163.5–164° C. is 7.52 g. (49%). Further recrystallization from a mixture of benzene and hexane gives product, M.P. 164.5–165° C.

*Analysis.*—Calculated for $C_{19}H_{24}N_4$: C, 73.99; H, 7.84; N, 18.17. Found: C, 73.99; H, 7.99; N, 18.14.

EXAMPLE 20

*N-[5(6)-chloro-2-benzimidazolyl]-N-benzyl-N',N'-dimethylethylenediamine*

N-benzyl-N- (2-dimethylaminoethyl) -S-methylisothiourea dihydrobromide (30.0 g., 0.0726 mole) and 4-chloro-1,2-phenylenediamine (51.76 g., 0.373 mole) are pulverized, intimately mixed and heated to 90–95° C. under a slow stream of nitrogen for 89 hours. The viscous black reaction mixture is digested with 250 ml. of boiling water and extracted with hot benzene. The aqueous layer is separated but yields none of the expected product. The black tarry water insoluble material is treated with 100 ml. of chloroform and 50 ml. of 20% sodium hydroxide solution. The aqueous layer is extracted with two additional 100 ml. portions of chloroform, the extracts washed with water, and the chloroform evaporated yielding a black partially crystalline mass. Crystallization from a mixture of benzene and hexane gives 10.44 g. of a gray solid, M.P. 119–134° C. (sinters, 105° C.). The solid is warmed on the steam-bath with a solution of 10 g. of citric acid in 190 ml. of water. Insoluble material is removed and the solution extracted with benzene. The aqueous layer then is made basic and the base extracted with three 100 ml. portions of chloroform. After washing the extract with water, the chloroform is evaporated to give a crystalline residue. Recrystallization from a mixture of benzene and hexane gives 6.21 g. (26%) of N-[5(6)-chloro-2-benzimidazolyl]-N - benzyl - N',N'-dimethylethylenediamine, M.P. 147–147.5° C. (sinters, 146.5° C.). Further recrystallization raises the M.P. to 147.5–148.5° C. (sinters 147° C.).

*Analysis.*—Calculated for $C_{18}H_{21}ClN_4$: C, 65.74; H, 6.44; Cl, 10.78; N, 17.04. Found: C, 65.85; H, 6.54; N, 17.04.

EXAMPLE 21

*N-[(6)-methoxy-2-benzimidazolyl]-N-benzyl-N',N'-dimethylethylenediamine*

N-benzyl - N - (2-dimethylaminoethyl) - S - methylisothiourea dihydrobromide (17.36 g., 0.042 mole) and 4-methoxy-1,2-phenylenediamine (17.21 g., 0.125 mole) are mixed and heated to 90–95° C. under a slow stream of nitrogen. After a period of 48 hours, the temperature is raised to 120° C. for another 24 hours. The residue then is heated on the steam-bath with 100 ml. of water. The dark green-blue solution is extracted with three 100 ml. portions of benzene. The aqueous layer then is made basic with sodium hydroxide and extracted with four 50 ml. portions of chloroform. The chloroform extract is washed with water and the solvent evaporated on the steam-bath under reduced pressure. The residue is placed in a distilling flask and the volatile material distilled up to a bath temperature of 175° C. at 0.5 mm. The deep purple resinous residue weighs 5.68 g. It is dissolved in a solution of 3.5 g. of citric acid in 70 ml. of water and the solution extracted with three 25 ml. portions of chloroform. On making the aqueous solution basic with sodium hydroxide, a black oily product separates that crystallizes slowly. The product is collected and recrystallized from a mixture of benzene and hexane. The yield of N-[5(6)-methoxy-2-benzimidazolyl]-N-benzyl-N',N'dimethylethylenediamine, M.P. 132–133° C. (sinters 130° C.) is 3.65 g. (27%). Further recrystallization raises the M.P. to 134–135° C.

*Analysis.*—Calculated for $C_{19}H_{14}ON_4$: C, 70.34; H, 7.46; N, 17.27. Found: C, 70.57; H, 7.29; N, 17.23.

EXAMPLE 22

*N-(2-benzimidazolyl)-N-(p-chlorobenzyl)-N',N'-dimethylethylenediamine*

*Step A.*—By substituting the chemically equivalent quantity of N - (p-chlorobenzyl) - N - (2-dimethylaminoethyl)-thiourea for the N-benzyl-N-(2-dimethylaminoethyl)-thiourea of Example 18, step A, and following substantially the procedure of Example 18, step A, N-(p-chlorobenzyl) -N- (2-dimethylaminoethyl) -S-methylisothiourea dihydrobromide is obtained. This compound melts at 181–182° C.

*Analysis.*—Calculated for $C_{13}H_{20}ClN_3S \cdot 2HBr$: C, 34.87; H, 4.95; N, 9.39. Found: C, 24.23; H, 5.02; N, 9.34.

*Step B.*—The product of step A is condensed with 1,2-phenylenediamine substantially as described in Example 18, step A. The N-(2-benzimidazolyl)-N-(p-chlorobenzyl) - N',N' - dimethylethylenediamine melts at 126–126.5° C.

*Analysis.*—Calculated for $C_{18}H_{21}ClN_4$: C, 65.74; H, 6.44; N, 17.04. Found: C, 65.61; H, 6.57; N, 16.93;

EXAMPLE 23

*N-(2-benzimidazolyl)-N-benzyl-N',N'-diethylethylenediamine*

*Step A.*—By substituting the chemically equivalent quantity of N-benzyl-N-(2-diethylaminoethyl) - thiourea for the N-benzyl-N-(2-dimethylaminoethyl)-thiourea of Example 18, step A, and following substantially the procedure of Example 18, step A, except that the product is recrystallized from a mixture of 95% alcohol and ether, N-benzyl-N - (2-diethylaminoethyl) - S - methylisothiourea dihydrobromide is obtained in the form of white crystals, M.P., 191-192° C.

*Analysis.*—Calculated for $C_{15}H_{25}N_3S \cdot 2HBR$: C, 40.82; H, 6.17; N, 9.52. Found: C, 40.90; H, 6.22; N, 9.51.

*Step B.*—N-benzyl-N- (2-diethylamiinoethyl) - S-methylisothiourea dihydrobromide (15.45 g., 0.35 mole) and 1,2-phenylenediamine (18.92 g., 0.175 mole) are pulverized, intimately mixed and heated to 90–95° C. under a slow stream of nitrogen for 24 hours. The reaction mixture then is heated on the steam-bath with 150 ml. of water, cooled and extracted with 100 ml. of benzene. The benzene layer is eparated and discarded. A heavy water-insoluble layer separates that is combined with the water layer and the mixture made basic with sodium hydroxide and extracted with chloroform. The chloroform extract then is back extracted with a solution of 7.5 g. of citric acid in 150 ml. of water. On making the acid extract alkaline, 4.16 g. (37%) of crystalline N-(2-benzimidazolyl) - N - benzyl-N',N'-diethylethylenediamine, M.P. 103–107° C. is obtained. Two recrystallizations from a mixture of benzene and hexane raised the M.P. to 110.5–111° C.

Analysis.—Calculated for $S_{20}H_{26}N_4$: C, 74.49; H, 8.13; N, 17.38. Found: C, 74.27; H, 8.12; N, 17.32.

EXAMPLE 24

N-[5(6)-methyl-2-benzimidazolyl] - N - benzyl - N',N'-diethylethylenediamine

By substituting the chemically equivalent quantity of 4-methyl-1,2-phenylenediamine for the 1,2-phenylenediamine of Example 23, step B, and following substantially the method of Example 23, step B, N-[5(6)-methyl-2-benzimidazolyl]-N-benzyl-N',N' - diethylethylenediamine is obtained. The product melts at 103–104° C. after recrystallization from hexane.

Analysis.—Calculated for $C_{21}H_{28}N_4$: C, 74.96; H, 8.39; N, 16.65; Found: C, 75.08; H, 8.31; N, 16.71.

EXAMPLE 25

N-(5,6-dimethyl - 2 - benzimidazolyl) - N - benzyl-N',N'-eiethylethylenediamine

N-benzyl-N - (2 - diethylaminoethyl) - S - methylisothiourea dihydrobromide (15.45 g., 0.035 mole) and 4,5-dimethyl-1,2-phenylenediamine (14.30 g., 0.105 mole) are heated to 95° C. under the conditions described in Example 18, step B for 65 hours. The product is isolated substantially as described in Example 19. The N-(5,6-dimethyl-2-benzimidazolyl)-N - benzyl - N',N' - diethylethylenediamine melts at 153–154.5° C. after recrystallization from mixtures of alcohol and water.

Analysis.—calculated for $C_{22}H_{30}N_4$: C, 75.39; H, 8.63; N, 15.99; Found: C, 75.37; H, 8.53; N, 15.82.

EXAMPLE 26

N-(2-benzimidazoly) - N - benzyl - N'.N' - dimethyl-1,3-propanediamine dihydrobromide 2-chlorobenzimidazole (7.18 g., 0.0472 mole) and N-benzyl - N',N' - dimethyl - 1,3-propanediamine (9.06 g., 0.0472 mole) are mixed with 35 g. of phenol and heated to 150° C. for 24 hours. The reaction mixture then is treated with 10 ml. of concentrated hydrochloric acid and steam distilled until free of phenol. The aqueous residue from the steam distillation then is extracted while warm with two 50 ml. portions of chloroform. An insoluble solid is separated by filtration. The aqueous layer then is made basic with sodium hydroxide and extracted with three 50 ml. portions of benzene. After washing with water the benzene is distilled and the residue is heated to 175° C. at reduced pressure (0.1 mm.) until distillation of the unreacted diamine is complete. The brown resinous residue then is crystallized from a mixture of benzene and hexane. The crude N-(2-benzimidazoly)-N-benzyl-N',N' - dimethyl-1,3-propanediamine, M.P. 112–118° C. weighs 4.47 g. It is dissolved in 25 ml. of absolute alcohol and treated with 3.32 ml. of a 8.72 N solution of hydrobromic acid. The solvent then is evaporated on the steam-bath under reduced pressure and the residue crystallized from a mixture of absolute alcohol, acetone and absolute ether. The crude dihydrobromide is recrystallized again and reconverted to the base that melts at 126–128° C. Analytically pure base from another experiment melted at 127–129° C.

Analysis.—Calculated for $C_{19}H_{24}N_4$: C, 73.99; H, 7.84; N, 18.17. Found: C, 73.78; H, 7.72; N, 17.87.

The base is converted to the dihydrobromide as described above. The dihydrobromide of N-(2-benzimidazolyl)-N-benzyl - N',N' - dimethyl - 1,3 - propanediamine melts at 234–235° C. after recrystallization from a mixture of absolute alcohol and absolute ether.

Analysis.—Calculated for $C_{19}H_{24}N_4 \cdot 2HBr$: C, 48.52; H, 5.57; N. 11.91; Found: C, 48.60; H, 5.66; N. 11.83.

EXAMPLE 27

N-[4(7)-ethoxy-2-benzimidazolyl] - N - (o-ethylbenzyl)-N',N'- dimethylethylenediamine Step A.—By replacing the N-benzyl-N-(2-dimethylaminoethyl)-thiourea employed in Example 18, step A, by an equimolecular quantity of N-(o-ethylbenzly)-N-(2-dimethylaminoethyl)-thiourea, and following substantially the same procedure described in Example 18, step A, there is obtained N-(o-ethylbenzyl)-N-(2-dimethylaminoethyl)-S-methylisothiourea dihydrobromide.

Step B.—By substituting the product obtained above and 3-ethoxy-1,2-phenylenediamine for the N-benzyl-N-(2-dimethylaminoethyl) - S - methylisothiourea and 1,2-phenylenediamine employed in Example 18, step B, and following substantially the same procedure described in Example 18, step B, there is obtained N-[4(7)ethoxy-2-benzimidazolyl]-N-(o-ethylbenzyl - N,N' - dimethylethylenediamine.

EXAMPLE 28

N-[5(6)-butyl-2 - benzimidazolyl] - N - benzyl - N',N'-diethylethylenediamine

Step A.—By replacing the N-benzyl - N - (2-dimethylaminoethyl)- thiourea employed in Example 18, step A, by an equimolecular quantity of N-benzyl-N-(2-diethylaminoethyl)-thiourea, and following substantially the same procedure described in Example 18, step A, there is obtained N-benzyl-N-(2-diethylaminoethyl)-S-methylisothiourea.

Step B.—By substituting the product obtained above and 4-butyl-1,2-phenylenediamine for the N-benzyl-N-(2-dimethylaminoethyl) - S - methylisothiourea and 1,2-phenylenediamine employed in Example 18, step B, and following substantially the same procedure described in Example 18, step B, there is obtained N-[5(6)-butyl-2-benzimidazolyl]-N-benzyl-N',N', - dithylethylenediamine.

EXAMPLE 29

N-[1 - ethyl-2-benzimidazolyl]-N-benzyl-N',N'-dimethylethylenediamine

By replacing the 1,2-phenylenediamine employed in Example 18, step B, by an equimolecular quantity of N-ethyl-1,2-phenylenediamine, and following substantially the same procedure described in Example 18, step B, there is obtained N[1-ethyl-2-benzimidazolyl]-N-benzyl-N',N'-dimethylethylenediamine.

EXAMPLE 30

N-[5(6)-fluoro - 2 - benzimidazoly]-N-(p-fluorobenzyl)-N',N'-dimethylethylenediamine Step A.—By replacing the N-benzyl-N - (2 - dimethylaminoethyl)-thiourea employed in Example 18, step A, by an equimolecular quantity of N-(p-fluorobenzyl)-N-(2-dimethylaminoethyl)-thiourea and following substantially the same procedure described in Example 18, step A, there is obtained N-(p-fluorobenzyl)-N-(2-dimethylaminoethyl)-S-methylisothiourea.

Step B.—By substituting the product obtained above and 4-fluoro-1,2-phenylenediamine for the N-benzyl-N-(2 - dimethylaminoethyl) - S - methylisothiourea and 1,2-phenylenediamine employed in Example 18, step B, and following substantially the same procedure described in Example 18, step B, there is obtained N-[5(6)-fluoro-2-benzimidazolyl]-N-(p-fluorobenzyl)-N',N'-dimethylethylenediamine.

EXAMPLE 31

N-[5(6)-trifluoromethyl-2-benzimidazolyl]-N-benzyl-N',N'-dimethylethylenediamine By replacing the 1,2-phenylenediamine employed in Example 18, step B, by an equimolecular quantity of 4-trifluoromethyl-1,2-phenylenediamine, and following substantially the same procedure described in Example 18, step B, there is obtained N-[5(6)-trifluoromethyl-2-benzimidazolyl]-N-benzyl-N',N'-dimethylethylenediamine.

The compounds of this invention can be incorporated in suitable dosage forms by methods commonly practiced by pharmacists. Because special conditions need not be employed in preparing dosage forms of these compounds, the following example illustrates only one of the many methods by which these compounds can be compounded. It would be possible, of course, to combine other compatible therepeutically active ingredients with one or more benzimidazole compounds in any dosage form prepared.

EXAMPLE 32

Compressed tablet comprising 100 mg. active ingredient

N-(2-benzimidazolyl)-N-benzyl-N',N'-di-methyl-
  ethylenediamine _____g.___ 4,100.00
Starch, dried_____g.___ 3,950.35
Isopropyl alcohol, 99%_____cc.___ 2,600.00
Add:
  Starch, dried _____g.___ 430.50
  Magnesium stearate_____g.___ 129.15

The N-(2-benzimidazolyl) - N-benzyl-N',N'-dimethyl-ethylenediamine is ground to a powder capable of passing through a No. 60 screen. The starch then is thoroughly mixed with the N-(2-benzimidazolyl)-N-benzyl-N',N'-dimethylethylenediamine and the mixture then passed two times through a No. 60 bolting cloth and then remixed. Isopropyl alcohol, 99% then is added slowly in divided portions, each portion being thoroughly incorporated before the next portion is added. Care should be taken not to overwet with the isopropyl alcohol. After all of the alcohol has been added, the granulation is wet screened through a No. 10 screen and allowed to air dry to evaporate the alcohol, then oven dried at 120–130° F. for 16–18 hours. The dried material is reduced to No. 14 granules and the dried starch and magnesium stearate is bolted through No. 60 bolting cloth onto the granulation. The material is thoroughly mixed and then compressed into tablets using an $^{11}/_{32}$" flat, bevelled, scored punch yielding 41,000 tablets each having a thickness of 0.121±0.002", each weighing 0.210 grams and having a hardness of 4½ to 5 kg. measured by the Monsanto Chemical Co. tablet hardness tester apparatus, and a disintegration time of 6–7 minutes when tested on the U.S.P. tablet disintegrating apparatus. (U.S. Pharmacopoeia, 15th edition, page 937).

While the above examples describe the preparation of certain compounds which are illustrative of the novel compounds of this invention, and a certain specific dosage form suitable for administering the novel compounds in human or veterinary therapy, it is to be understood that the invention is not to be limited by these examples or by the specific reaction conditions described for the preparation of the compounds or by the specific ingredients included in the pharmaceutical preparation, but is understood to embrace variations and modifications falling within the scope of the appended claims.

What is claimed is:
1. A 2-aminobenzimidazole of the formula

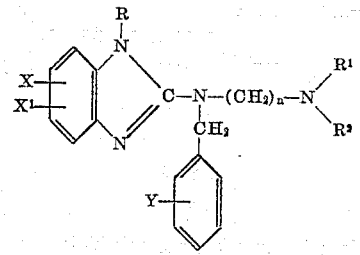

wherein X, $X^1$, and Y each is selected from the group consisting of hydrogen, halogen, a lower alkyl radical and a lower alkoxy radical; R is selected from the group consisting of hydrogen and a lower alkyl radical; $n$ is a numeral from 2 to 4;

is selected from the group consisting of a di-lower alkylamino, pyrrolidyl, piperidyl, and morpholinyl.

2. A 2-aminobenzimidazole of the formula

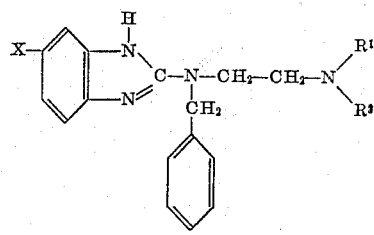

wherein X is a lower alkyl radical and

is a di-lower alkylamino group.

3. N-[5(6)-methyl-2-benzimidazolyl]-N-benzyl-N',N'-dimethylethylenediamine.

4. N-[5(6)-methyl-2-benzimidazolyl]-N-benzyl-N',N'-diethylethylenediamine.

5. A 2-aminobenzimidazole of the formula

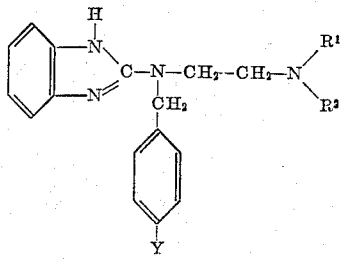

wherein Y is a lower alkoxy radical and

is a di-lower alkylamino group.

6. N-(2-benzimidazolyl)-N-(p-methoxybenzyl)-N',N'-diethylethylenediamine.

7. A 2-aminobenzimidazole of the formula

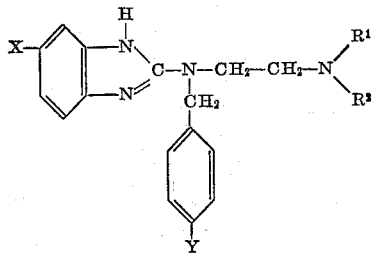

wherein X is a lower alkyl radical; Y is a halogen; and

is a di-lower alkylamino group.

8. N - [5(6) - methyl - 2 - benzimidazolyl] - N - (p-chlorobenzyl)-N',N'-diethylethylenediamine.

9. A 2-aminobenzimidazole of the formula

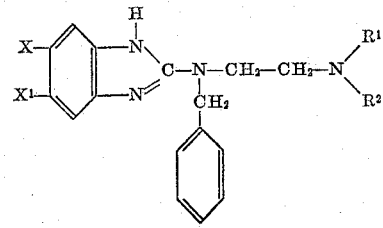

wherein X and $X^1$ each represents a lower alkyl radical and

is a di-lower alkylamino group.

10. N - (5,6 - dimethyl - 2 - benzimidazolyl) - N-benzyl-N',N'-diethylethylenediamine.

11. A process for preparing a 2-aminobenzimidazole wherein an N-benzyl-N-aminoalkylthiourea is heated with a compound selected from an alkyl halide, an aralkyl halide, and an ester of a sulfonic acid in an acidic medium and the S-alkylisothiourea thus obtained is condensed with a 1,2-phenylenediamine.

References Cited in the file of this patent

UNITED STATES PATENTS

| | | |
|---|---|---|
| 2,689,853 | Schenck et al. | Sept. 21, 1954 |
| 2,857,391 | Engelhardt et al. | Oct. 21, 1958 |

FOREIGN PATENTS

| | | |
|---|---|---|
| 424,476 | Great Britain | Feb. 21, 1935 |

OTHER REFERENCES

Elderfield: Heterocyclic Compounds (Wiley), vol. 5 (1959), page 285.